United States Patent
Huan

(10) Patent No.: US 11,836,154 B2
(45) Date of Patent: Dec. 5, 2023

(54) DATA SYNCHRONIZATION METHOD AND DEVICE FOR DATABASES, AND STORAGE MEDIUM

(71) Applicant: XI'AN ZHONGXING NEW SOFTWARE CO., LTD., Xi'an (CN)

(72) Inventor: Jiajia Huan, Shenzhen (CN)

(73) Assignee: XI'AN ZHONGXING NEW SOFTWARE CO., LTD., Xi'an (CN)

(*) Notice: Subject to any disclaimer, the term of this patent is extended or adjusted under 35 U.S.C. 154(b) by 0 days.

(21) Appl. No.: 17/782,855

(22) PCT Filed: Nov. 24, 2020

(86) PCT No.: PCT/CN2020/131181
§ 371 (c)(1),
(2) Date: Jun. 6, 2022

(87) PCT Pub. No.: WO2021/120995
PCT Pub. Date: Jun. 24, 2021

(65) Prior Publication Data
US 2023/0004576 A1 Jan. 5, 2023

(30) Foreign Application Priority Data
Dec. 16, 2019 (CN) .......................... 201911296442.4

(51) Int. Cl.
*G06F 16/27* (2019.01)
*G06F 16/23* (2019.01)

(52) U.S. Cl.
CPC ........ *G06F 16/273* (2019.01); *G06F 16/2379* (2019.01)

(58) Field of Classification Search
CPC .......................... G06F 16/273; G06F 16/2379
(Continued)

(56) References Cited

U.S. PATENT DOCUMENTS 9,519,674 B2 * 12/2016 Vermeulen ............ G06F 16/273
9,600,500 B1 * 3/2017 Gupta ..................... G06F 16/27
(Continued)

FOREIGN PATENT DOCUMENTS

| CN | 106033562 A | 10/2016 |
| CN | 106156174 A | 11/2016 |

(Continued)

OTHER PUBLICATIONS

Waqas, Ahmad, et al., "Transaction Management Techniques and Practices in Current Cloud Computing Environments: A Survey", International Journal of Database Management Systems (IJDMS), vol. 7, No. 1, Feb. 2015, pp. 41-59.*
(Continued)

*Primary Examiner* — Robert Stevens
(74) *Attorney, Agent, or Firm* — Vivacqua Crane, PLLC

(57) ABSTRACT

A data synchronization method and device for databases, and a storage medium are disclosed. The method includes: in the case where transaction response results fed back by multiple data nodes are all successful, receiving transaction commit request messages sent by a client, and writing a global transaction ID into a transaction processing list; sending the transaction commit request messages to the multiple data nodes; receiving transaction commit results fed back by the multiple data nodes; and in the case where the transaction commit results fed back by the multiple data nodes are all successful, applying to a global transaction manager to release the global transaction ID.

18 Claims, 2 Drawing Sheets

(58) Field of Classification Search
USPC .......................................................... 707/615
See application file for complete search history.

(56) References Cited

U.S. PATENT DOCUMENTS

| | | | | |
|---|---|---|---|---|
| 2002/0023129 | A1* | 2/2002 | Hsiao | G06F 9/466 |
| | | | | 714/E11.131 |
| 2012/0102006 | A1* | 4/2012 | Larson | G06F 16/27 |
| | | | | 707/703 |
| 2013/0036136 | A1* | 2/2013 | Horii | G06F 16/2308 |
| | | | | 707/E17.014 |
| 2015/0278030 | A1* | 10/2015 | Zhu | G06F 16/275 |
| | | | | 707/623 |
| 2016/0196322 | A1* | 7/2016 | Xu | G06F 16/24539 |
| | | | | 707/611 |
| 2016/0371356 | A1* | 12/2016 | Lee | G06F 16/273 |
| 2017/0220621 | A1 | 8/2017 | Colrain et al. | |
| 2018/0107703 | A1* | 4/2018 | Sharp | G06F 16/2365 |
| 2018/0349430 | A1* | 12/2018 | Lee | G06F 16/2365 |
| 2019/0171763 | A1* | 6/2019 | Cai | G06F 16/2379 |
| 2019/0392006 | A1* | 12/2019 | Horowitz | G06F 16/93 |
| 2021/0382877 | A1* | 12/2021 | Li | G06F 16/27 |

FOREIGN PATENT DOCUMENTS

| | | |
|---|---|---|
| CN | 106598992 A | 4/2017 |
| CN | 108932338 A | 12/2018 |

OTHER PUBLICATIONS

Das, Sudipto, et al., "ElasTraS: An Elastic, Scalable, and Self-Managing Transactional Database for the Cloud", ACM Transactions on Database Systems, vol. 38, Issue 1, Article No. 5, Apr. 2013, 45 pages.*

Alkhatib, Ghazi, et al., "Transaction Management in Distributed Database Systems: the Case of Oracle's Two-Phase Commit", Journal of Information Systems Education, vol. 13, No. 2, @ 2002, pp. 95-104.*

International Searching Authority. International Search Report and Written Opinion for PCT Application No. PCT/CN2020/131181 and English translation, dated Feb. 24, 2021, pp. 1-9.

Elmasri, et al. "Fundamentals of Database Systems," Addison-Wesley, Sixth Edition, 2011, pp. 877-927.

European Patent Office. Extended European Search Report for EP Application No. 20904001.3, dated Dec. 15, 2022, pp. 1-9.

\* cited by examiner

DATA SYNCHRONIZATION METHOD AND DEVICE FOR DATABASES, AND STORAGE MEDIUM

CROSS-REFERENCE TO RELATED APPLICATION

The present application is a national stage filing under 35 U.S.C. § 371 of international application number PCT/CN2020/131181, filed Nov. 24, 2020, which claims priority to Chinese patent application No. 201911296442.4 filed Dec. 16, 2019. The entire contents of these application are incorporated herein by reference.

TECHNICAL FIELD

The present disclosure relates to the technical field of databases, in particular to a data synchronization method for databases, a device, and a storage medium.

BACKGROUND

A heterogeneous database system is a collection of related multiple database systems, for example, a collection of a distributed database system and a standalone database system. In a data synchronization scenario of the heterogeneous database system, it is necessary to synchronize the data of a client to a distributed database and a standalone database. According to an existing data synchronization method capable of being applied to the scenario, a Proxy provided between the client and the databases is configured to receive transaction data of the client, rewrite the transaction data into structured languages that can be executed by the distributed database and the standalone database correspondingly, and send the corresponding structured languages to the distributed database and the standalone database respectively, so as to synchronize the data of the client to the distributed database and the standalone database.

SUMMARY

A general summary of the subject matters detailed in this disclosure is provided below. The summary is not intended to limit the scope of protection of the claims.

In accordance with an aspect of the present disclosure, an embodiment provides a data synchronization method for databases, a device, and a storage medium, which can realize data synchronization between a distributed database and a standalone database in a heterogeneous database system.

In accordance with an aspect of the present disclosure, an embodiment provides a data synchronization method for databases, including: receiving a transaction start request sent by a client; in response to the transaction start request, applying to a global transaction manager for a global transaction ID; receiving the global transaction ID fed back by the global transaction manager, and feeding back a transaction start success message to the client; in the case where the global transaction ID fed back by the global transaction manager is received, receiving transaction request messages sent by the client, where the transaction request messages carry first transaction statements to be executed; sending the global transaction ID and the transaction request messages to a plurality of data nodes of a distributed database; receiving transaction response results fed back by the plurality of data nodes; in the case where the transaction response results fed back by the plurality of data nodes are all successful, feeding back a transaction response success message to the client; receiving transaction commit request messages sent by the client, and writing the global transaction ID into a transaction processing list; sending the transaction commit request messages to the plurality of data nodes; receiving transaction commit results fed back by the plurality of data nodes; in the case where all the transaction commit results fed back by the plurality of data nodes are successful, feeding back a transaction commit success message to the client, and applying to the global transaction manager to release the global transaction ID, so that a synchronization module may acquire the first transaction statements corresponding to the released global transaction ID from the plurality of data nodes.

In accordance with an aspect of the present disclosure, an embodiment provides a data synchronization method for databases, including: acquiring both a to-be-processed transaction and a global transaction ID corresponding to the to-be-processed transaction from a transaction processing list; querying a global transaction manager to identify whether the global transaction ID of the to-be-processed transaction is released; in response to the global transaction ID of the to-be-processed transaction is released, acquiring first transaction statements corresponding to the global transaction ID from a plurality of data nodes of a distributed database; converting the acquired first transaction statements into second transaction statements adapted to a standalone database for execution; sending the second transaction statements to the standalone database; and updating the to-be-processed transaction corresponding to the global transaction ID in the transaction processing list to be "processed".

In accordance with an aspect of the present disclosure, an embodiment provides a device, including: a memory configured to store a program; a processor configured to execute the program stored in the memory, where the program stored in the memory, when executed by the processor, causes the processor to perform any data synchronization method for databases as described above.

In accordance with an aspect of the present disclosure, an embodiment provides a computer readable storage medium storing a computer executable instruction which, when executed by a processor, causes the processor to perform any data synchronization method for databases as described above.

Other features and advantages of this disclosure will be set forth in the following description, and partly become obvious from the description, or understood by implementing this disclosure. The objects and other advantages of this disclosure can be realized and obtained by the structure particularly pointed out in the description, claims and drawings.

BRIEF DESCRIPTION OF DRAWINGS

The drawings are provided for a further understanding of the technical schemes of the present disclosure, and constitute a part of the description. The drawings and the embodiments of the present disclosure are used to explain the technical schemes of the present disclosure, and not intended to limit the technical schemes of the present disclosure.

DETAILED DESCRIPTION

In order to make the object, technical schemes and advantages of this disclosure clearer, this disclosure will be further described in detail in conjunction with the drawings and embodiments. It should be understood that the specific embodiments described herein are only used to explain this disclosure, and are not used to limit this disclosure.

It should be understood that in the description of the embodiments of the present disclosure, the meaning of "multiple" (or "a plurality of") is two or more. Greater than, less than, exceeding, etc. are understood as excluding this number, while above, below, within, etc. are understood as including this number. "First", "second" and the like are only used for the purpose of distinguishing technical features, rather than being understood to indicate or imply relative importance or hint the number of indicated technical features or hint the sequence relationship of indicated technical features.

A heterogeneous database system is a collection of related multiple database systems, for example, a collection of a distributed database system and a standalone database system. In a data synchronization scenario of the heterogeneous database system, it is necessary to synchronize the data of a client to a distributed database and a standalone database. According to an existing data synchronization method capable of being applied to the scenario, a Proxy provided between the client and the databases is configured to receive a synchronization request from the client, rewrite the request into structured languages that can be executed by a distributed database and a standalone database correspondingly, and send the corresponding structured languages to the distributed database and the standalone database respectively, so as realize the data synchronization between them. The above synchronization method has the disadvantage that if the distributed database and the standalone database feedback different response results after receiving the request, the Proxy can't process the request, and may even block the transaction request from the client.

An embodiment of the present disclosure provides a data synchronization method for databases, a device, and a storage medium, which can realize data synchronization between a distributed database and a standalone database in a heterogeneous database system.

Figure 1:
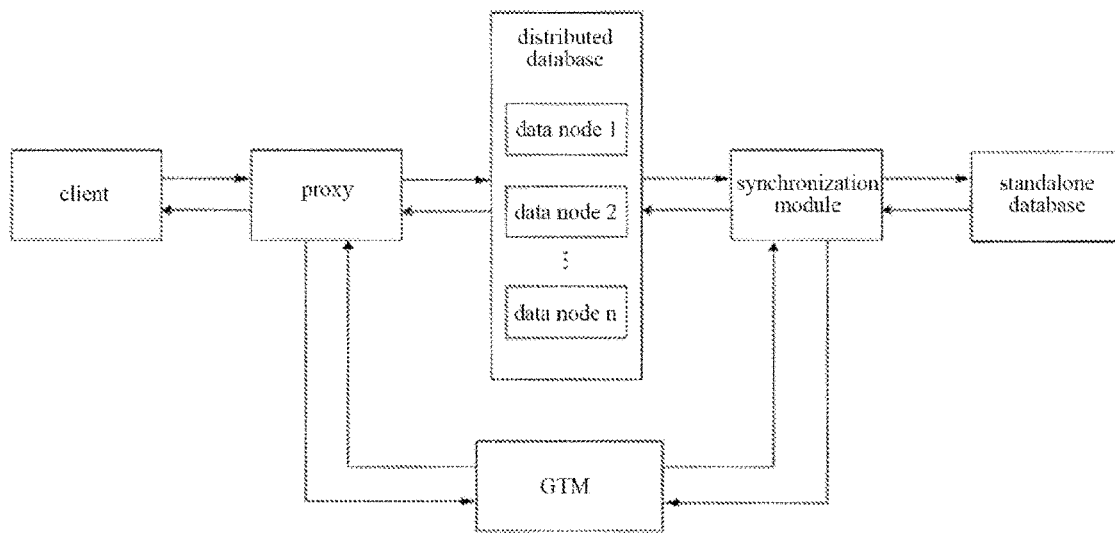
FIG. 1 is a schematic diagram of an application scenario of a data synchronization method for databases according to an embodiment of the present disclosure.

FIG. 1 shows a schematic diagram of an application scenario of a data synchronization method for databases according to an embodiment of the present disclosure. The architecture of the scenario includes a client, a distributed database, a standalone database, a proxy, a synchronization module and a Global Transaction Manager (GTM).

The client is configured to initiate a transaction to command the databases to implement data synchronization operations of addition, deletion and modification through the transaction.

The distributed database includes multiple data nodes, each data node being configured to implement the transaction from the client to synchronize data related to the transaction.

The standalone database is a database that can only run on a standalone computer and does not provide network functions. For example, ACCESS, FOXPRO and the like are all standalone databases.

The proxy is configured to forward statements in the transaction sent by client to the distributed database for execution, so that the distributed database may synchronize data related to the transaction.

The synchronization module is configured to acquire transaction statements corresponding to a Global Transaction ID (GTID) from data nodes of the distributed database, convert the transaction statements into statements adapted to the standalone database, and send the statements to the standalone database for execution, so as to finally realize data synchronization between the distributed database and the standalone database.

The GTM is configured to manage (create/release/query) the life cycle of global transactions, and assign the GTID to the global transactions, so as to realize the isolation between transactions.

Figure 2:
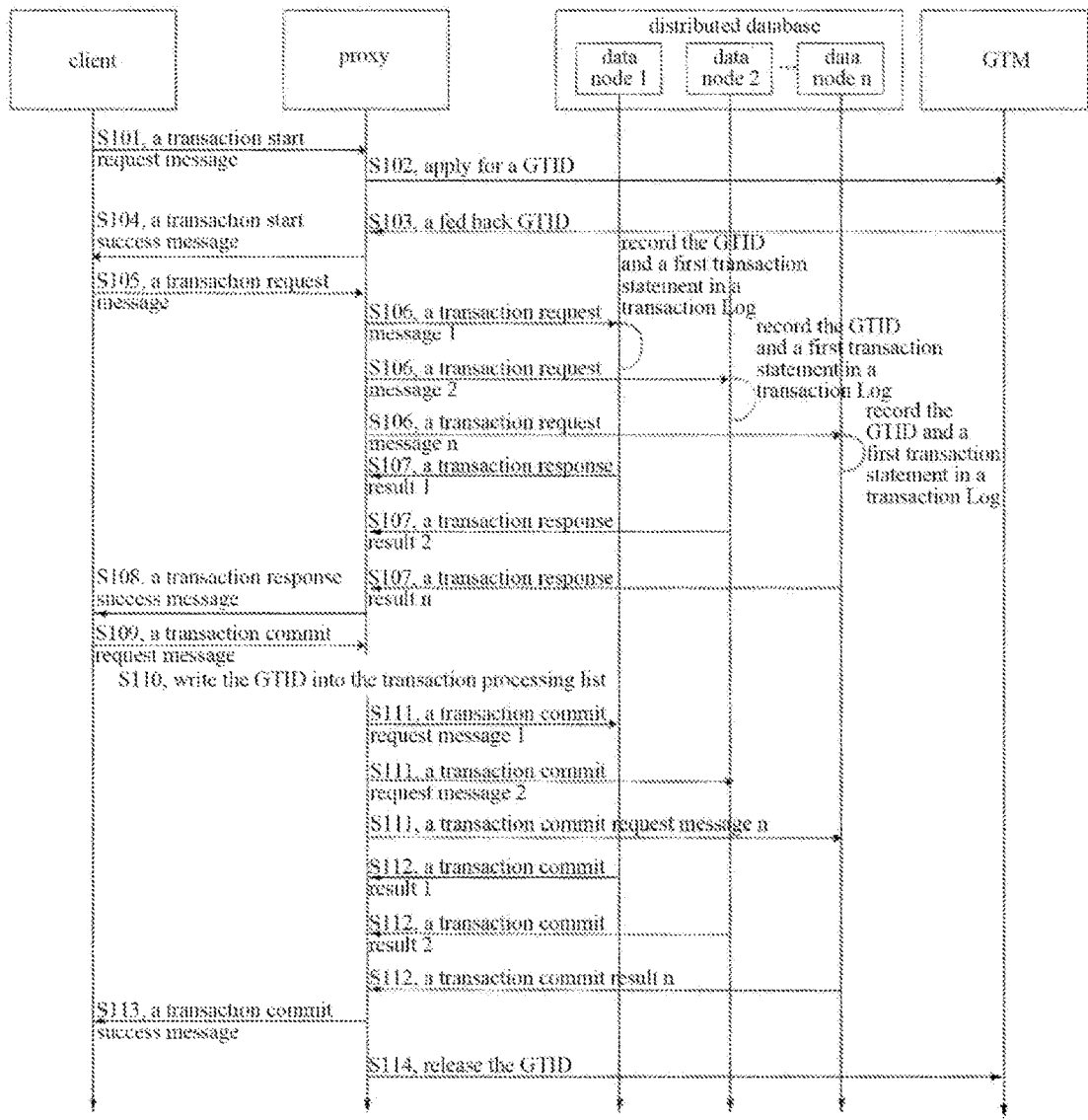
FIG. 2 is a flowchart of a data synchronization method for databases according to an embodiment of the present disclosure.

FIG. 2 shows a data synchronization method for databases according to an embodiment of the present disclosure. The method may be implemented by the proxy in the scenario shown in FIG. 1. As shown in FIG. 2, the method includes, but is not limited to steps as follow.

At S101, a transaction start request sent by a client is received.

When needing to synchronize service data to the databases, the client sends a transaction start request to the proxy, and the proxy receives the transaction start request from the client.

At S102, in response to the transaction start request, an application is made to a GTM for a GTID.

After receiving the transaction start request sent by the client, the proxy applies to the GTM for the GTID.

At S103, the GTID fed back by the GTM is received.

After receiving the GTID application sent by the proxy, the GTM assigns the GTID to the transaction and feeds back the GTID to the proxy, and the proxy receives the GTID from the GTM.

At S104, a transaction start success message is fed back to the client.

After receiving the GTID fed back by the GTM, the proxy feeds back the transaction start success message to the client, so that the client further sends transaction request messages after receiving the transaction start success message sent by the proxy.

At S105, the transaction request messages corresponding to the GTID sent by the client are received. The transaction request messages carry first transaction statements to be executed.

The proxy receives the transaction request messages corresponding to the GTID sent by the client. The transaction request messages carry first transaction statements to be executed. The first transaction statements are statements adapted to be executable for the distributed database, for example, SQL statements.

At S106, both the GTID and the transaction request messages are sent to multiple data nodes of the distributed database.

In some examples, after receiving the transaction request messages from the client, the proxy sends the GTID and the transaction request messages to the multiple data nodes of the distributed database, and waits for the response from each data node. The transaction request messages are configured to query whether each data node can execute a transaction commit operation. It should be understood that multiple data nodes herein are transaction participants related to the transaction initiated by the client.

After receiving the GTID and the transaction request messages, each data node parses the transaction request messages to execute the first transaction statements in the transaction request messages, and records the GTID and corresponding first transaction statements in a transaction log.

At S107, transaction response results fed back by the multiple data nodes are received.

In some examples, all the data nodes feedback transaction response results to the proxy. If successfully executing the transaction, the data nodes feedback "successful" to the proxy, indicating that the transaction can be executed. Otherwise, if unsuccessfully executing the transaction, the data nodes feedback "unsuccessful" to the proxy, indicating that the transaction cannot be executed. The proxy receives the transaction response results fed back by all data nodes, and determines whether the transaction response results fed back by all the data nodes are "successful".

At S108, a transaction response success message is fed back to the client.

After the proxy receives the transaction response results fed back by the multiple data nodes, if all the transaction response results fed back by the data nodes to the proxy are "successful", the proxy feeds back a transaction response success message to the client, so that the client can further send transaction commit request messages to the proxy after receiving the transaction response success message sent by the proxy.

It should be understood that once a transaction response result fed back by a data node to the proxy is "unsuccessful", the proxy does not execute steps S107 to S114.

In a distributed transaction processing scenario, a complete transaction often needs to invoke multiple services. For example, in a common "transfer" transaction, the following services are required to be invoked: 1. Create a transaction order; 2. Create a payment order; 3. Deduct from account A and deposit from account B. Each service may be completed through steps S105 to S108. The client sends first transaction statements corresponding to the services to the data nodes participating in the transaction. Therefore, those having ordinary skill in the art should understand that steps S105 to S108 may be repeatedly executed multiple times between steps S104 and S109 to complete the whole transaction.

At S109, the transaction commit request messages sent by the client are received.

At S110, the GTID is written into the transaction processing list.

In the case where all the transaction response results fed back by the data nodes are "successful", the proxy receives the transaction commit request messages sent by the client, and writes the GTID into the transaction processing list. It should be understood that the orders of steps S109 and S110 may be interchanged here.

In some examples, the transaction processing list may be created by the proxy, and then may be sent to the data nodes together with the transaction commit request messages. A component that manages the transaction processing list may be set independently, and this component may perform operations such as creating and updating the transaction processing list.

In some examples, when the GTID is written into the transaction processing list, information about data nodes can also be written into the transaction processing list. The information about data nodes participating in the transaction is written in the transaction processing list, so that the synchronization module can search for the data nodes participating in the transaction matching the GTID in the subsequent step, so as to synchronize the related data to the standalone database.

In some examples, when the GTID is written into the transaction processing list, a transaction processing status can also be written into the transaction processing list, so that the synchronization module can acquire unprocessed transactions from the transaction processing list in the subsequent steps, so as to synchronize related data to the standalone database. Of course, it is also possible to delete the processed transaction from the transaction processing list instead of writing the transaction processing status into the transaction processing list, so that the synchronization module can also acquire the unprocessed transactions from the transaction processing list.

At S111, the transaction commit request messages are sent to the multiple data nodes.

In the embodiment of the present disclosure, after receiving the transaction commit request messages from the client, the proxy sends the transaction commit request messages to all the data nodes participating in the transaction.

In some examples, in step S111, when the transaction commit request messages are sent to the multiple data nodes, the transaction processing list is also sent to the multiple data nodes, so the transaction processing list is sent to the data nodes along with the transaction commit request messages, such that the data nodes can execute corresponding transaction commit operations according to the GTID recorded in the transaction processing list.

In the embodiment of the present disclosure, before the transaction is committed, a transaction request message is sent to all data nodes to query whether the transaction commit operation may be executed, and the transaction commit operation may be executed only when all data nodes can execute the transaction commit operation, so as to ensure the consistency in the data synchronization process of the distributed database.

At S112, transaction commit results fed back by multiple data nodes are received.

After receiving the transaction commit request messages, all data nodes execute the transaction commit operation, and feedback the transaction commit results to the proxy after completion. The proxy receives the transaction commit results fed back by all data nodes, and in the case where all the transaction commit results fed back by data node are successful, steps S113 and S114 are executed.

At S113, the proxy feeds back a transaction commit success message to the client.

The proxy feeds back the transaction commit success message to the client, and informs the client that the transaction is successfully committed to the distributed database, so that the client can start the next transaction, avoiding the transaction jam of the client.

At S114, in the case where the transaction commit results fed back by the multiple data nodes are all successful, an application is made to the GTM to release the GTID.

In some examples, if the commit results fed back by the data nodes to the proxy are all "successful", the proxy applies to the GTM to release the GTID of the transaction. If a commit result fed back by a data node to the proxy is "unsuccessful", the GTID of the transaction is kept in an occupied status. After the GTID is released, the synchronization module can use the released GTID to acquire first transaction statements corresponding to the GTID from the multiple data nodes.

It should be understood that the orders of step S113 and step S114 may be interchanged.

In the embodiment of the present disclosure, the GTID of the transaction sent by the client is recorded in the transaction processing list, and the transaction is executed and committed by the distributed database through the first transaction statement adapted to the distributed database for execution, so that the distributed database synchronizes the data related to the transaction. After the distributed database commits the transaction, an application is made to the GTM to release the GTID of the transaction. Here, the function of releasing the GTID corresponding to the transaction is to enable the synchronization module to acquire unprocessed transactions from the transaction processing list, determine the first transaction statements to be acquired from all data node of the distributed database by identifying whether the GTID of the unprocessed transactions is released, and then convert these first transaction statements into second transaction statements adapted to the standalone database and send the statements to the standalone database for synchronization.

Figure 3:
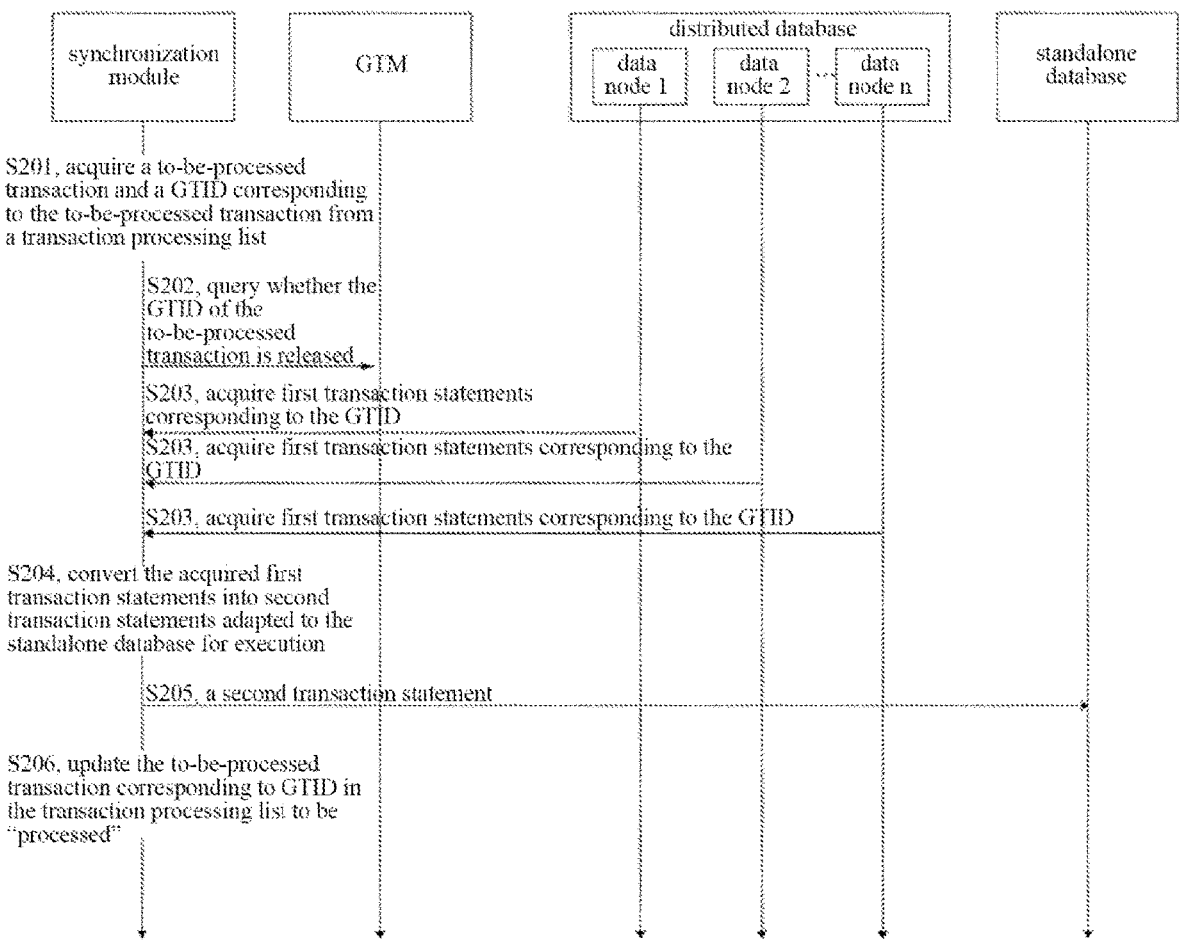
FIG. 3 is a flowchart of another data synchronization method for databases according to an embodiment of the present disclosure.

FIG. 3 shows another data synchronization method for databases according to an embodiment of the present disclosure. The method may be executed by the synchronization module in the scenario shown in FIG. 1. As shown in FIG. 3, the method includes, but is not limited to steps as follow.

At S201, both a to-be-processed transaction and a GTID corresponding to the to-be-processed transaction are acquired from a transaction processing list.

The to-be-processed transaction herein refers to a transaction that is not synchronized to the standalone database. Both the to-be-processed transaction and the GTID corresponding to the to-be-processed transaction may be acquired from the transaction processing list. In some embodiments, in addition to recording the GTID, the transaction processing list also records a transaction processing status corresponding to the GTID, according to which unprocessed transactions can be known. In some embodiments, after being processed, the transaction is deleted from the transaction processing list, so all transactions in the transaction processing list are unprocessed transactions.

At S202, a GTM is queried whether the GTID of the to-be-processed transaction is released.

The synchronization module queries the GTM whether the GTID is released according to the acquired GTID of the to-be-processed transaction.

At S203, when the GTID of the to-be-processed transaction is released, first transaction statements corresponding to the GTID are acquired from multiple data nodes of the distributed database.

In some examples, for the to-be-processed transaction of which the GTID is released, the synchronization module may acquire corresponding first transaction statements from the data nodes of the distributed database participating in the transaction.

At S204, the acquired first transaction statements are converted into second transaction statements adapted to the standalone database for execution.

At S205, the second transaction statements are sent to the standalone database.

In some examples, the synchronization module sends the second transaction statements converted from the first transaction statements to the standalone database, so that the standalone database can execute the second transaction statements, thereby achieving the purpose of synchronizing the data related to the to-be-processed transaction to the standalone database.

In a possible implementation, the synchronization module assembles all the second transaction statements into a single complete transaction, and sends the single complete transaction to the standalone database, so that that the standalone database executes the single complete transaction.

At S206, the to-be-processed transaction corresponding to GTID in the transaction processing list is updated to "processed".

In the case where the data related to the to-be-processed transaction are all synchronized to the standalone database, the to-be-processed transaction corresponding to GTID in the transaction processing list is updated to be "processed". For example, transaction processing status corresponding to the GTID in the transaction processing list may be updated to be "processed", or items corresponding to the GTID may be deleted directly from the transaction processing list.

In the embodiment of the present disclosure, the synchronization module acquires unprocessed transactions from the transaction processing list, then acquires first transaction statements corresponding to the released global transaction ID from all data nodes of the distributed database, converts these first transaction statements into second transaction statements adapted to the standalone database, sends the statements to the standalone database for synchronization, and updates the to-be-processed transaction in the transaction processing list to be "processed". Based on the technical schemes of the embodiments of the present disclosure, data synchronization between the distributed database and the standalone database in the heterogeneous database system can be realized, and the problem of inconsistency caused by sending requests to the two databases at the same time may be solved by adopting one-way synchronization and binding the information of the to-be-processed transaction with the success or failure of the transaction committing, thereby greatly improving the reliability of data synchronization.

Figure 4:
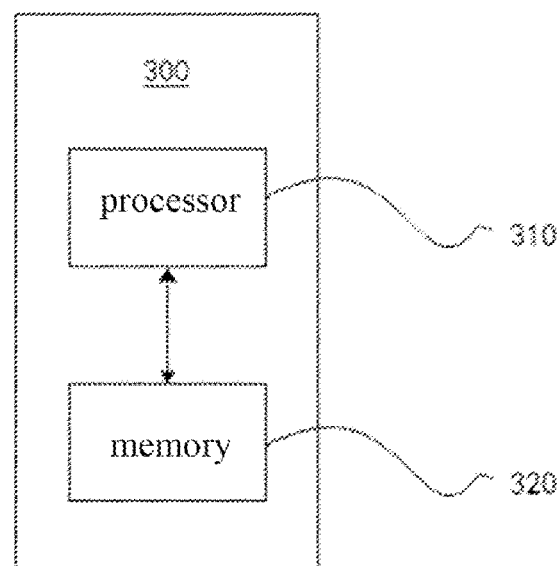
FIG. 4 is a structural schematic diagram of a device according to an embodiment of the present disclosure.

FIG. 4 shows a device 300 according to an embodiment of the present disclosure. As shown in FIG. 4, the device 300 includes, but is not limited to as follow.

A memory 320 is configured to store a program.

A processor 310 is configured to execute the program stored in the memory 320. The program stored in the memory 320, when executed by the processor 310, causes the processor 310 to implement any one data synchronization method for databases described above.

The processor 310 and the memory 320 may be connected by a bus or other means.

As a non-transient computer readable storage medium, the memory 320 may be configured to store a non-transient software program and non-transient computer executable programs, such as the data disaster recovery drill method described in the embodiment of the present disclosure. The processor 310 executes non-transient software programs and instructions stored in the memory 320, thereby realizing any one data synchronization method for databases described above.

The memory 320 may include a program storage area and a data storage area, where the program storage area may store an operating system, and an application program required by a function; and the data storage area may store any of the data synchronization method for databases described above. In addition, the memory 320 may include a high-speed random access memory, and may further include a non-transient memory, such as a magnetic disk storage device, a flash memory device, or other non-transient solid status storage device. In some implementations, the memory 320 may include memories remotely located with respect to the processor 310, and these remote memories may be connected to the device through networks. Examples of the above networks include, but are not limited to, the Internet, intranet, local area network, mobile communication network and combinations thereof.

Non-transient software programs and instructions required to implement any of the data synchronization method for databases described above are stored in the memory 320. The non-transient software programs and instructions, when executed by one or more processors 310, are configured to execute any of the data synchronization method for databases described above, for example, the method steps S101 to S114 described in FIG. 2 and the method steps S201 to S206 described in FIG. 3.

An embodiment of the present disclosure further provides a computer readable storage medium storing a computer executable instruction. The computer executable instruction is configured to execute any of the data synchronization method for databases as described above.

In an embodiment, the computer readable storage medium stores a computer executable instruction which, when executed by one or more control processors 310, for example, one of the processors 310 in the device 300, may cause the one or more processors 310 to implement any of the data synchronization method for databases described above, for example, the method steps S101 to S114 described in FIG. 2 and the method steps S201 to S206 described in FIG. 3.

In the embodiment of the present disclosure, one the one hand, the GTID of the transaction sent by the client is recorded in the transaction processing list, and the transaction is executed and committed by the distributed database through the first transaction statement adapted to the distributed database for execution, so that the distributed database synchronizes the data related to the transaction. After committing the transaction, the distributed database releases the GTID of the transaction. On the other hand, the unprocessed transactions are acquired from the transaction processing list, and then the first transaction statements corresponding to the global transaction ID are acquired from all data nodes of the distributed database according to the released global transaction ID. These first transaction statements are converted into second transaction statements adapted to the standalone database, and then sent to the standalone database for synchronization, and the transaction is updated to be "processed" in the transaction processing list. Based on the technical schemes of the embodiments of the present disclosure, data synchronization between the distributed database and the standalone database in the heterogeneous database system can be realized, and the problem of inconsistency caused by sending requests to the two databases at the same time is solved by adopting one-way synchronization and binding the information of the to-be-processed transaction with the success or failure of the transaction committing, thereby greatly improving the reliability of data synchronization.

The device embodiments described above are merely illustrative, and the units described as separate components may or may not be physically separated, that is, may be located in one place, or may be distributed onto multiple network elements. Some or all of the modules may be selected according to actual needs to achieve the purpose of this embodiment.

As will be understood by those having ordinary skill in the art that all or some of the steps, and systems in the method disclosed above may be implemented as software, firmware, hardware and appropriate combinations thereof. Some or all of the physical components may be implemented as software executed by a processor, such as a central processing unit, a digital signal processor or a microprocessor, or as hardware, or as an integrated circuit, such as an application specific integrated circuit. Such software may be distributed on a computer readable medium, and the computer readable medium may include a computer storage medium (or a non-transitory medium) and a communication medium (or a transitory medium). As well known to those having ordinary skill in the art, the term computer storage medium includes volatile and nonvolatile, removable and non-removable media implemented in any method or technology for storing information such as computer readable instructions, data structures, program modules or other data. A computer storage medium may include RAM, ROM, EEPROM, flash memory or other memory technologies, CD-ROM, digital versatile disk (DVD) or other optical disk storage, magnetic cassette, magnetic tape, magnetic disk storage or other magnetic storage devices, or any other media that can be used to store desired information and can be accessed by a computer. In addition, it is well known to those having ordinary skill in the art that the communication medium may generally include computer readable instructions, data structures, program modules or other data in a modulated data signal such as a carrier wave or other transmission mechanism, and may include any information delivery medium.

The above is a detailed description of the implementation of this disclosure, but this disclosure is not limited to the above embodiments. Those familiar with this field can also make various equivalent modifications or substitutions without violating the sharing conditions of the scope of the present disclosure, and these equivalent modifications or substitutions are included in the scope defined by the claims of the present disclosure.

What is claimed is:

1. A data synchronization method for databases, comprising:

receiving a transaction start request sent by a client;

in response to the transaction start request, applying to a global transaction manager for a global transaction ID;

receiving the global transaction ID fed back by the global transaction manager, and feeding back a transaction start success message to the client;

in the case where the global transaction ID fed back by the global transaction manager is received, receiving transaction request messages sent by the client, wherein the transaction request messages carry first transaction statements to be executed;

sending the global transaction ID and the transaction request messages to a plurality of data nodes of a distributed database;

receiving transaction response results fed back by the plurality of data nodes;

in the case where the transaction response results fed back by the plurality of data nodes are all successful, feeding back a transaction response success message to the client;

receiving transaction commit request messages sent by the client, and writing the global transaction ID into a transaction processing list;

sending the transaction commit request messages to the plurality of data nodes;

receiving transaction commit results fed back by the plurality of data nodes; and in the case where all the transaction commit results fed back by the plurality of data nodes are successful, feeding back a transaction commit success message to the client, and applying to the global transaction manager to release the global transaction ID, so that a synchronization module acquires the first transaction statements corresponding to the released global transaction ID from the plurality of data nodes.

2. The method of claim 1, further comprising:
in response to writing the global transaction ID into the transaction processing list, further writing at least one of the following contents into the transaction processing list:
information about data nodes; and
transaction processing status.

3. The method of claim 2, further comprising:
in response to sending the transaction commit request messages to the plurality of data nodes, sending the transaction processing list to the plurality of data nodes.

4. The method of claim 1, further comprising:
in response to sending the transaction commit request messages to the plurality of data nodes, sending the transaction processing list to the plurality of data nodes.

5. A non-transitory computer readable storage medium storing a computer executable instruction which, when executed by a processor, causes the processor to perform:
the method of claim 1.

6. The non-transitory computer readable storage medium of claim 5, wherein the method further comprising:
in response to writing the global transaction ID into the transaction processing list, further writing at least one of the following contents into the transaction processing list:
information about data nodes; and
transaction processing status.

7. The non-transitory computer readable storage medium of claim 6, wherein the method further comprises:
in response to sending the transaction commit request messages to the plurality of data nodes, sending the transaction processing list to the plurality of data nodes.

8. The non-transitory computer readable storage medium of claim 5, wherein the method further comprises:
in response to sending the transaction commit request messages to the plurality of data nodes, sending the transaction processing list to the plurality of data nodes.

9. A data synchronization method for databases, comprising:
acquiring both a to-be-processed transaction and a global transaction ID corresponding to the to-be-processed transaction from a transaction processing list;
querying a global transaction manager to identify whether the global transaction ID of the to-be-processed transaction is released;
in response to the global transaction ID of the to-be-processed transaction being released, acquiring first transaction statements corresponding to the global transaction ID from a plurality of data nodes of a distributed database;
converting the acquired first transaction statements into second transaction statements adapted to a standalone database for execution;
sending the second transaction statements to the standalone database; and
updating the to-be-processed transaction corresponding to global transaction ID in the transaction processing list to be "processed".

10. The method of claim 9, wherein sending the second transaction statements to the standalone database comprises:
assembling all the second transaction statements into a single complete transaction, and sending the single complete transaction to the standalone database.

11. A device, comprising:
a memory configured to store a program;
a processor configured to execute the program stored in the memory, wherein the program stored in the memory, when executed by the processor, causes the processor to perform the method of claim 9.

12. The device of claim 11, wherein sending the second transaction statements to the standalone database comprises:
assembling all the second transaction statements into a single complete transaction, and sending the single complete transaction to the standalone database.

13. A non-transitory computer readable storage medium storing a computer executable instruction which, when executed by a processor, causes the processor to perform the method of claim 9.

14. The non-transitory computer readable storage medium of claim 13, the method further comprises:
assembling all the second transaction statements into a single complete transaction, and sending the single complete transaction to the standalone database.

15. A device, comprising:
a memory configured to store a program;
a processor configured to execute the program stored in the memory, wherein the program stored in the memory, when executed by the processor, causes the processor to perform a data synchronization method for databases comprising:
receiving a transaction start request sent by a client;
in response to the transaction start request, applying to a global transaction manager for a global transaction ID;
receiving the global transaction ID fed back by the global transaction manager, and feeding back a transaction start success message to the client;
in the case where the global transaction ID fed back by the global transaction manager is received, receiving transaction request messages sent by the client, wherein the transaction request messages carry first transaction statements to be executed;
sending the global transaction ID and the transaction request messages to a plurality of data nodes of a distributed database;
receiving transaction response results fed back by the plurality of data nodes;
in the case where the transaction response results fed back by the plurality of data nodes are all successful, feeding back a transaction response success message to the client;
receiving transaction commit request messages sent by the client, and writing the global transaction ID into a transaction processing list;
sending the transaction commit request messages to the plurality of data nodes;
receiving transaction commit results fed back by the plurality of data nodes; and
in the case where all the transaction commit results fed back by the plurality of data nodes are successful, feeding back a transaction commit success message to the client, and applying to the global transaction manager to release the global transaction ID, so that a synchronization module acquires the first transaction statements corresponding to the released global transaction ID from the plurality of data nodes.

16. The device of claim 15, wherein the data synchronization method further comprises:
   in response to writing the global transaction ID into the transaction processing list, further writing at least one of the following contents into the transaction processing list:
   information about data nodes; and
   transaction processing status.

17. The device of claim 15, wherein the data synchronization method further comprises:
   in response to sending the transaction commit request messages to the plurality of data nodes, sending the transaction processing list to the plurality of data nodes.

18. The device of claim 17, wherein the data synchronization method further comprises:
   in response to sending the transaction commit request messages to the plurality of data nodes, sending the transaction processing list to the plurality of data nodes.

* * * * *